(12) United States Patent
Thomas

(10) Patent No.: US 7,748,740 B2
(45) Date of Patent: Jul. 6, 2010

(54) AIR BAG WITH VOLUME-FILLING MECHANICAL STRUCTURE

(75) Inventor: Scott D. Thomas, Novi, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 1205 days.

(21) Appl. No.: 11/159,594

(22) Filed: Jun. 23, 2005

(65) Prior Publication Data

US 2006/0290121 A1    Dec. 28, 2006

(51) Int. Cl.
*B60R 21/16* (2006.01)

(52) U.S. Cl. ............... 280/743.1; 280/729; 280/752

(58) Field of Classification Search ............ 280/729, 280/730.1, 730.2, 743.1, 743.2, 752, 753
See application file for complete search history.

(56) References Cited

U.S. PATENT DOCUMENTS

| | | | | | |
|---|---|---|---|---|---|
| 3,792,873 | A | * | 2/1974 | Buchner et al. | 280/743.1 |
| 3,843,150 | A | * | 10/1974 | Harada et al. | 280/729 |
| 4,441,751 | A | * | 4/1984 | Wesley | 296/180.1 |
| 5,098,124 | A | * | 3/1992 | Breed et al. | 280/751 |
| 5,454,589 | A | * | 10/1995 | Bosio et al. | 280/729 |
| 5,505,485 | A | * | 4/1996 | Breed | 280/729 |
| 6,158,771 | A | * | 12/2000 | Nusser et al. | 280/752 |
| 6,494,484 | B2 | * | 12/2002 | Bosgieter et al. | 280/743.1 |
| 6,695,346 | B1 | * | 2/2004 | Keshavaraj | 280/743.1 |
| 6,702,366 | B1 | | 3/2004 | Browne et al. | 296/187.02 |
| 7,140,478 | B2 | * | 11/2006 | Barvosa-Carter et al. | 188/267 |
| 7,350,851 | B2 | * | 4/2008 | Barvosa-Carter et al. | 296/187.02 |
| 2003/0075953 | A1 | * | 4/2003 | Hirota et al. | 296/189 |
| 2005/0110257 | A1 | * | 5/2005 | Cohen | 280/743.1 |
| 2005/0151351 | A1 | * | 7/2005 | Enders et al. | 280/730.1 |
| 2006/0232051 | A1 | * | 10/2006 | Morris et al. | 280/732 |

OTHER PUBLICATIONS

U.S. Appl. No. 11/085,359, filed Mar. 21, 2005, Morris et al.
U.S. Appl. No. 11/105,281, filed Apr. 13, 2005, Morris et al.

* cited by examiner

*Primary Examiner*—Eric Culbreth
(74) *Attorney, Agent, or Firm*—Quinn Law Group, PLLC

(57) ABSTRACT

A volume-filling mechanical structure includes an air bag cushion, an inflator configured to inflate the air bag cushion, and a celled material expandable from a dormant state to a deployed state. The celled material is operably coupled to the air bag cushion and a vehicle structure, wherein deployment of the air bag cushion causes deployment of the celled material from the dormant state to the deployed state.

20 Claims, 2 Drawing Sheets

AIR BAG WITH VOLUME-FILLING MECHANICAL STRUCTURE

TECHNICAL FIELD

The present invention relates to structures used for crash mitigation and/or crash energy management at around the time of a vehicle crash, and more particularly, to means for deploying mechanical structures, which are volumetrically reconfigurable such as to occupy a small volume when in a dormant state and then rapidly expand to a larger volume in a deployed state when needed for providing crash mitigation and/or crash energy management.

BACKGROUND OF THE INVENTION

A vehicle, in addition to the inherent crush characteristics of its structure, may have dedicated crash energy management structures. Their function is to dissipate energy in the event of a crash. Such dedicated structures have predetermined crush characteristics which contribute to the resulting deceleration pulse to which the occupants are subjected.

In the vehicular arts there are two known types of such dedicated crash energy management structures: those which are passive, and those which are active.

An example of a passive dedicated crash energy management structure is an expanded honeycomb celled material, which has been used to a limited degree in certain vehicles. FIG. 1 exemplifies the process of fabrication of a honeycomb-celled material. A roll 10 of sheet material having a preselected width W is cut to provide a number of substrate sheets 12, each sheet having a number of closely spaced adhesive strips 14. The sheets 12 are stacked and the adhesive cured to thereby form a block, referred to as a HOBE® (registered trademark of Hexcel Corporation) block 16 having a thickness T. The HOBE block is then cut into appropriate lengths L to thereby provide HOBE bricks 18. The HOBE brick is then expanded by the upper and lower faces 20, 22 thereof being separated away from each other, where during expansion, the adhesive strips serve as nodes where the touching sheets are attached to each other. A fully expanded HOBE brick is composed of a honeycomb celled material 24 having clearly apparent hexagonal cells 26. The ratio of the original thickness T to the expanded thickness T' is between 1 to 20 to 1 to 60. An expanded honeycomb celled material provides crash energy management parallel to the cellular axis at the expense of vehicular space that is permanently occupied by this dedicated energy management structure.

Typically, crash energy management structures have a static configuration in which their starting volume is the same as their fixed, operative volume. When involved in a crash, they dissipate energy and modify the timing characteristics of the deceleration pulse by being compressed (i.e., crushing or stroking of a piston in a cylinder) from a larger to a smaller volume. Since these passive crash energy management structures occupy a maximum volume in the uncrushed/unstroked, initial state, they inherently occupy vehicular space that must be dedicated for crash energy management. Expressed another way, passive crash energy management structures use valuable vehicular space equal to their initial volume which is dedicated exclusively to crash energy management throughout the life of the vehicle even though a crash may never occur, or may occur but once during that time span. This occupied space is not available for other uses, including functions such as enabling a more spacious vehicle interior and styling flexibility.

For example, the fixed fore-aft location of a knee bolster may constrain how far the lower portion of the instrument panel can be placed forward and away from the knees of an occupant.

Active crash energy management structures have a predetermined size which expands at the time of a crash so as to increase their contribution to crash energy management.

One type of dedicated active crash energy management structure is a stroking device, basically in the form of a piston and cylinder arrangement. Stroking devices have low forces in extension and significantly higher forces in compression (such as an extendable/retractable bumper system) which is, for example, installed at either the fore or aft end of the vehicle and oriented in the anticipated direction of crash induced crush. The rods of such devices would be extended to span the previously empty spaces upon the detection of an imminent crash or an occurring crash (if located ahead of the crush front). This extension could be triggered alternatively by signals from a pre-crash warning system or from crash sensors or be a mechanical response to the crash itself. An example would be a forward extension of the rod due to its inertia under a high G crash pulse. Downsides of such an approach include high mass and limited expansion ratio (1 to 2 rather than the 1 to 20 to 1 to 60 possible with a compressed honeycomb celled material).

Another type of active dedicated crash energy management structure includes inflatable air bags or pyrotechnic air cans. Downsides of such systems, in addition to those discussed above, include low force levels and low ratios of crush force to added mass due to the lack of mechanical rigidity of these systems.

As such, what has further been sought in the vehicular arts is a dedicated vehicular crash energy management structure which provides, at times other than a crash event, open spaces for other uses than crash pulse management, a high crush force, and a high crush force to mass ratio. Examples of some such active and passive devices are detailed, for example, in U.S. Pat. No. 6,702,366 the contents of which are incorporated by reference herein. U.S. Pat. No. 6,702,366 provides for both active and passive crash energy management structures. Specifically, U.S. Pat. No. 6,702,366 describes the use of a honeycomb celled material, such as that described above that expands from a dormant state to a deployed state at around the time of a crash. U.S. Pat. No. 6,702,366 does not provide for specific deployment means of the honeycomb celled material.

However, existing occupant restraint devices and crash energy management devices have not been provided with deployment means since most of such devices are of a fixed size and placement and merely deform to absorb crash energy or restrain vehicle occupants or pedestrians. Thus, there has been little development of deployment means for such devices. Accordingly, what remains needed in the vehicular arts is a means for deploying a volume-filling mechanical structure from a smaller dormant state to a larger deployed state at around the time of a crash event.

SUMMARY OF THE INVENTION

A volume-filling mechanical structure includes an air bag cushion, an inflator configured to inflate the air bag cushion, and a celled material expandable from a dormant state to a deployed state. The celled material is operably coupled to the air bag cushion and the vehicle structure, wherein deployment of the air bag cushion causes deployment of the celled material from the dormant state to the deployed state.

In another embodiment herein, a system to harness energy from deployment of an air bag to expand an energy absorbing structure includes an air bag module, an air bag cushion disposed in the air bag module, an air bag inflator disposed in the air bag module, the air bag inflator in operable communication with the air bag to inflate the same, and a celled material expandable from a dormant state to a deployed state. The celled material is operably coupled to the air bag cushion and the air bag module, wherein deployment of the air bag cushion causes deployment of the celled material from the dormant state to the deployed state.

In yet another embodiment herein, a method for attenuating a vehicle crash energy impact includes attaching a volume-filling mechanical structure to an air bag system defined by a vehicle structure, an air bag cushion, and an inflator configured to inflate the air bag cushion. The volume-filling mechanical structure includes a celled material expandable from a dormant state to a deployed state, the celled material operably coupled to the air bag cushion and the vehicle structure. The celled material is expanded by deploying the air bag cushion causing deployment of the celled material from the dormant state to the deployed state, wherein the celled material absorbs kinetic energy from the energy impact.

In yet another embodiment herein, a vehicle equipped with a crash energy management structure includes an air bag system and a crash energy management structure connected to the air bag system. The crash energy management structure includes a volume-filling mechanical structure connected to the air bag system, the volume-filling mechanical structure including a celled material expandable from a first volume to a second volume, wherein the second volume is larger than the first volume. Deployment of the air bag cushion causes deployment of the celled material from the dormant state to the deployed state.

These and additional features and advantages will become clearer from the following specification.

DESCRIPTION OF THE PREFERRED EMBODIMENT

Figure 1:
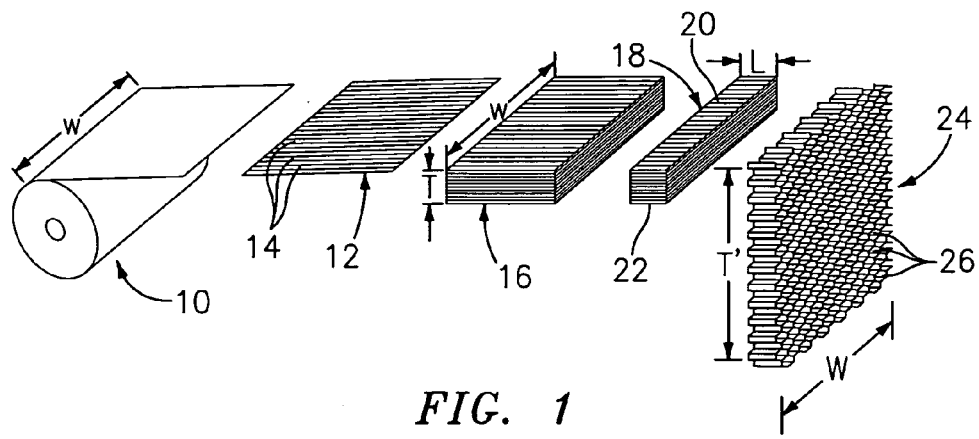
FIG. 1 is a series of perspective views of a manufacturing process to provide a prior art honeycomb celled material.

Disclosed herein is a mechanical, active dedicated crash energy management structure for providing crash mitigation and/or crash energy management, wherein the structure has a dormant (initial) smaller state volume, but then in the event of a crash, utilizes deployment of an air bag that timely expands into a much larger deployed volume for providing management of energy of an expectant crash. It has a small dormant volume (during normal driving conditions), which allows empty space adjacent thereto for enabling a more spacious vehicle interior and styling flexibility, and only assumes a larger deployed volume just prior to, or in response to, a crash.

Briefly stated, the exemplary embodiments of the crash energy management structures described herein incorporate a honeycomb celled material brick (honeycomb brick) such as for example manufactured by Hexcel Corp. of Pleasanton, Calif. Upon deployment, the expansion of the honeycomb brick is in a plane transverse to the cellular axis of the cells thereof, and cells crush in a direction parallel to the cellular axis to absorb the crash's energy.

The honeycomb brick occupies anywhere from approximately 1/20th to 1/60th of the volume that it assumes when in it is fully deployed (the expansion ratio) into a deployed honeycomb celled material (deployed honeycomb), depending on the original cell dimensions and wall thickness. Honeycomb cell geometries with smaller values of the expansion ratio in general deliver larger crush forces, and the choice of the honeycomb celled material is dependent upon the crush force (stiffness) desired in a particular crash energy management application (i.e., softer or harder metals or composites). Deployed honeycomb celled material has excellent crash energy management capabilities, but only parallel to the cellular axis, as discussed hereinabove.

According to one embodiment herein, an air bag system provides means for deploying a volume-filling mechanical structure, such as an expandable honeycomb brick located either within or outside an air bag cushion. The honeycomb brick is disposed so that the common cellular axis of its cells is oriented parallel to an envisioned crash axis, i.e., the direction of impact for which it is intended to serve as an energy absorber. A rigid end cap may be attached to at least a movable end of the honeycomb brick (the ends which are perpendicular to the transverse plane and parallel to the crash axis).

In the event of a crash, an expanding air bag cushion provides deployment of the honeycomb brick by expanding the honeycomb brick in the transverse plane into the previously unoccupied transversely adjacent space. For example, expansion of the honeycomb brick is triggered by expansion of an air bag cushion by filling the same with a gas. Upon expansion, this previously unoccupied space will now function efficiently for crash energy management.

Accordingly, the present disclosure provides a crash energy management structure that comprises an expandable volume-filling mechanical structure for containing and cushioning occupants within the vehicle in impacts with both interior and exterior objects, wherein the volume-filling mechanical structure has means for, in the event of a crash, timely expanding into a deployed volume for providing energy absorption in a crash. Around the time of a crash event is when the means for deploying the volume-filling structure may be actuated. The current disclosure deploys the volume-filling mechanical structures such as honeycomb celled material with an air bag for applications within or outside the vehicle.

The benefit(s) of utilizing an expandable energy absorbing structure within an air bag are as follows: For applications where vehicle energy is to be absorbed, a fairly rigid structure can be deployed that can absorb energy. Examples of this may include deployable outer structures to absorb energy from crushing vehicle exterior components or striking vehicles. Some examples where the direction of energy absorption is approximately 90 degrees from the axis of deployment that could benefit from this approach are knee air bags, side impact air bags and curtain air bags, but is not limited thereto. For example, such employment allows variation of current knee bolster design guidelines while providing for easy deployment of honeycomb celled material from a dormant state to a deployed state without significant expense or complexity.

Referring generally now to the drawings, FIGS. 2 through 17 depict exemplary embodiments of an active dedicated crash energy management structure employed with an air bag system or module 100. A honeycomb brick 102 including a honeycomb celled material 104 is provided in (for example) accordance with a method of manufacture utilized to provide HOBE® bricks, as discussed hereinabove. The honeycomb brick 102 is not expanded such that it is at its most compacted state. Attached at opposing ends or lower and upper faces 106, 108, respectively, of the honeycomb brick 102 (such as for example by an adhesive) to a fixed structure 110 and an air bag cushion 112. In an exemplary embodiment as depicted, the air bag module includes a fixed structure 110. The upper and lower faces of the honeycomb brick 102 serve as guide members for defining the configuration of the honeycombed cell material 104 between a dormant state as shown at FIG. 2 and a deployed state as shown at FIG. 3.

Existing air bags are deployed and filled with gas from an inflator. The gas pressure is used to restrain occupants or objects that compress the air bag cushion. The present disclosure introduces an expandable energy absorbing structure within or external to the air bag cushion. This structure may supplement the inflator gas pressure as a means of absorbing penetrating occupant or object energy once the air bag cushion is expanded upon air bag deployment. The expanding energy absorbing structure is the honeycomb celled material 104 or other celled material that can be packaged flat and pulled into shape when stretched. The expanding energy absorbing structure provides energy absorption in a direction approximately 90 degrees from the axis of expansion.

Figures 2, 3, 4, 5:
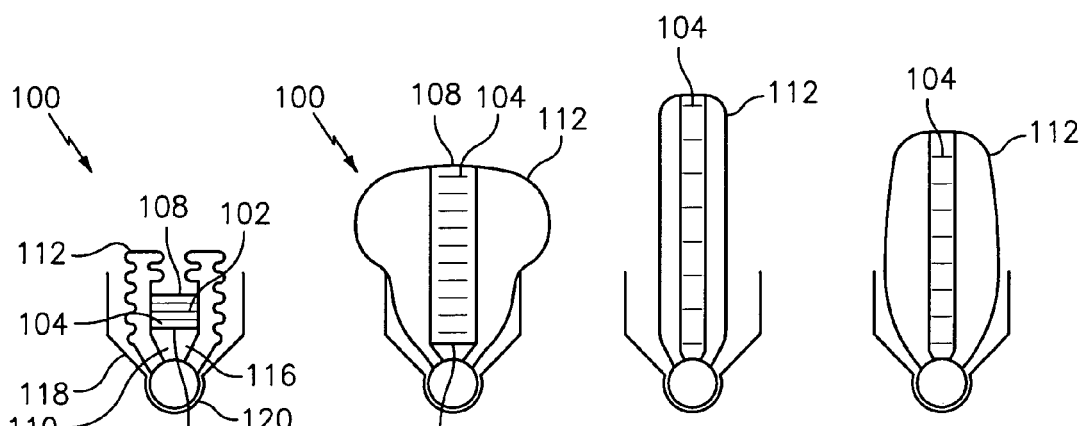
FIG. 2 is a cross section view of an air bag system having the honeycomb celled material of FIG. 1 disposed in a folded air bag cushion in accordance with an exemplary embodiment.
FIG. 3 illustrates initial deployment of the folded cushion of FIG. 2 causing the honeycomb celled material to expand.
FIG. 4 illustrates the cushion of FIG. 3 reaching full extension.
FIG. 5 illustrates the cushion of FIG. 4 settling into a deployed position.

FIG. 2 shows air bag system or module 100 having a folded air bag cushion 112, a fixed structure 110 that may optionally include an outer structure 118 and an inner structure 116. An inflator 120 is also included to inflate the cushion 112. A cover (not shown) can be optionally placed over the module to prevent the exterior environment from interacting with the air bag module internals prior to deployment.

An expandable energy absorbing structure (EEAS) 104 is attached between the cushion 112 and the fixed structure 110. In an exemplary embodiment, EEAS includes honeycomb celled material 104. The EEAS 104 may be attached to cushion 112 and the structure 110 using numerous methods. Glue, mechanical prongs inserted into the EEAS cells, mechanical fasteners, stitching, and other mechanical or chemical means may be used to provide direct attachment. In addition, an intermediate plate (not shown) may be used to which the EEAS 104 is attached, which in turn is attached to the cushion 112 or the structure 110. Any of the fastening means previously cited may be utilized for the interfaces to the intermediate plate.

As shown in FIG. 3, upon deployment, the inflator 120 releases gas into the folded cushion 112 causing it to expand. Upon expansion, the cushion 112 pulls on the EEAS 104, expanding it between the cushion 112 and the structure 110.

As the deployment continues, the cushion 112 will reach full extension, as shown in FIG. 4, and settles into a deployed position as illustrated in FIG. 5. Tethers (not shown) can be included in the air bag cushion 112 to help control cushion 112 and EEAS 104 trajectory. At this point, the EEAS 104 is fully deployed and is located with the honeycomb cells or other cellular material oriented in a direction approximately perpendicular to the direction of deployment.

Figures 6, 7, 8:
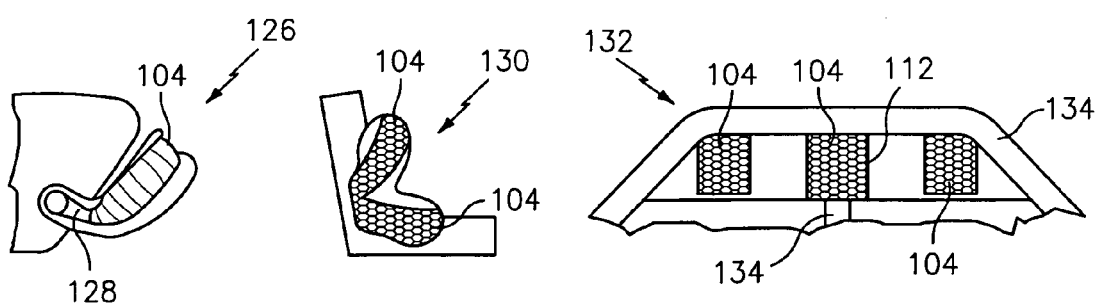
FIG. 6 illustrates the air bag system of FIG. 2 employed in a knee air bag application where the honeycomb celled material includes a reduced cross-sectional area about which the honeycomb celled material can bend and deform during deployment to assume a desired deployed geometry in accordance with an exemplary embodiment.
FIG. 7 illustrates the air bag system of FIG. 2 employed in a pelvis thorax side air bag application in accordance with an exemplary embodiment.
FIG. 8 illustrates the air bag system of FIG. 2 employed in a curtain air bag application in accordance with an exemplary embodiment.

FIG. 6 illustrates a knee air bag application 126 where the EEAS 104 may optionally have a reduced cross-sectional area at 128 about which the EEAS can bend and deform during deployment to assume a desired deployed geometry. More specifically, it will be recognized by those skilled in the pertinent art that the reduced cross-sectional area at 128 facilitates bending thereabout relative to a remaining cross-sectional area of the EEAS 104.

FIG. 7 illustrates a pelvis thorax air bag application 130 in an alternative exemplary embodiment. One or more EEAS's 104 can be included to increase energy absorption capacity in areas such as the pelvic region and optionally the thorax region where occupant loads are best absorbed.

FIG. 8 illustrates a curtain air bag application 132 in an alternative exemplary embodiment. Multiple EEAS's 104 may be positioned in respective cushions 112 to provide energy absorption capacity where occupants are likely to be located or around vehicle structure such as pillars 134.

Figure 9:
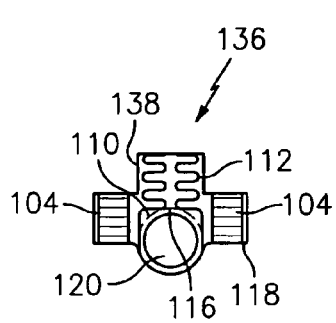
FIG. 9 illustrates an air bag system in a dormant state having a pair of honeycomb celled materials outside the air bag cushion in accordance with an exemplary embodiment.

FIG. 9 illustrates an air bag system 136 in an alternative exemplary embodiment. The air bag system 136 contains folded cushion 112, structure 110 that may optionally consist of an outer structure 118 and an inner structure 116. An inflator 120 is also included to inflate the cushion 112. A cover 138 can be placed over the module to prevent the exterior environment from interacting with the air bag module internals prior to deployment.

One or more EEAS's 104 are attached between cover 138 and structure 110. Each EEAS 104 may be attached to cover 138 and structure 110 using numerous methods. Glue, mechanical prongs inserted into the EEAS cells, mechanical fasteners, stitching, and other mechanical or chemical means may be used to provide direct attachment. Cushion 112 may or may not be attached to an intermediate plate (not shown) or the cover 138. The plate may be the cover 138 for the air bag system 136 or may be attached to or interface with a separate cover (not shown). In this approach the EEAS 104 is positioned outside of the cushion 112.

Figure 10:
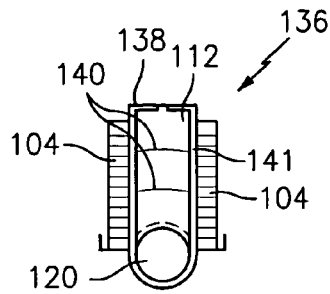
FIG. 10 illustrates the air bag system of FIG. 9 in a deployed state.

As shown in FIG. 10, upon deployment, the inflator 120 releases gas into the folded cushion 112 causing cushion 112 to expand. Upon expansion, cushion 112 pushes the plate or cover 138 which pulls the EEAS 104, expanding EEAS 104 between the cover 138 and the structure 110. Cushion 112 may contain tethers 140 to control the cushion's trajectory during deployment. A sheath 141 is optionally disposed between cushion 112 and the EEAS 104 to prevent the cushion from damaging the EEAS or being damaged by the EEAS upon deployment.

Figure 11:
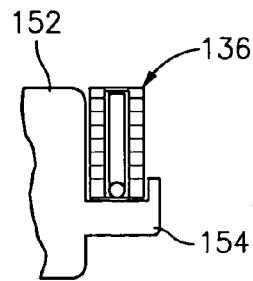
FIG. 11 illustrates the air bag system of FIGS. 9 and 10 employed in a bumper application in accordance with an exemplary embodiment.

FIG. 11 shows the air bag system 136 of FIGS. 9 and 10 employed in a bumper application. Air bag system 136 expands upward, as illustrated, upon deployment to provide additional energy absorption material forward of a vehicle body 152 above a bumper 154.

Figure 12:
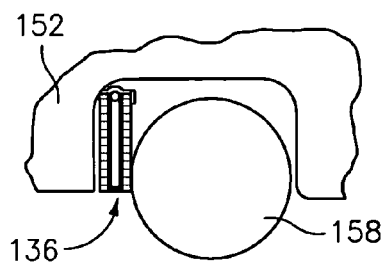
FIG. 12 illustrates the air bag system of FIGS. 9 and 10 employed in a wheel well application in accordance with an exemplary embodiment.

FIG. 12 shows the air bag system 136 of FIGS. 9 and 10 employed in a wheel well application. Air bag system 136 expands downward, as illustrated, upon deployment to provide additional energy absorption material between a wheel 158 and the vehicle body 152.

Figures 13, 14:
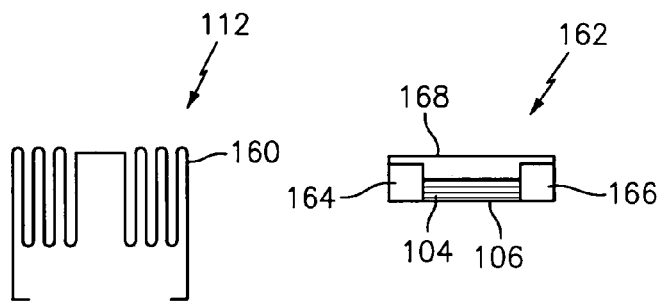
FIG. 13 is a cross section view of a bellows type air bag cushion in accordance with an exemplary embodiment.
FIG. 14 illustrates an air bag system with two air bag cushions that expand a single honey comb celled material therebetween in accordance with an exemplary embodiment.

As shown in FIG. 13, for any of the approaches described herein, cushion 112 can be folded in a bellows type of arrangement generally shown at 160, so that upon deployment, the bellows expand. Cushion 112 may be made of a fabric, rubber, thin sheet metal or a combination of any of these materials.

As discussed above, multiple air bags may be used to deploy an EEAS 104. FIG. 14 shows an air bag system 162 with two air bags 164, 166 that upon deployment, push a plate 168 expanding the attached EEAS 104. A non-moving side 106 of the EEAS 104 is anchored to the air bag system 162 or adjacent fixed structure.

Figure 15:
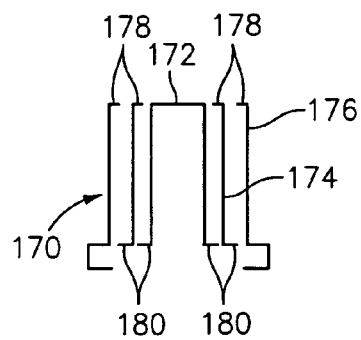
FIG. 15 illustrates an air bag system having a multi-piece cushion structure that can be deployed and expanded in accordance with an exemplary embodiment.

FIG. 15 illustrates an alternative embodiment of air bag system 162 having a multi-piece cushion structure 170 that can be deployed and expanded. In the alternative embodiment illustrated, three consecutive sleeves 172, 174, 176 telescope when deployed. Flanges 178 engage respective flanges 180 on contiguous sleeves 172, 174, 176 upon full extension during deployment.

Figure 16:
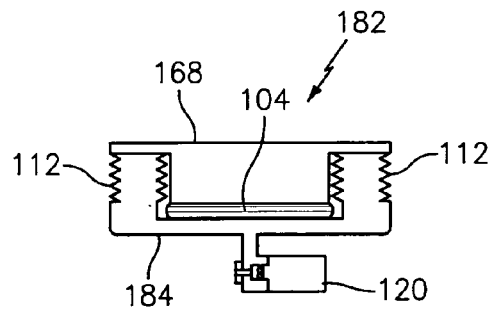
FIG. 16 illustrates an air bag system with a single honeycomb celled material and single inflator that is attached to a pair of air bag cushions via tubing in accordance with an exemplary embodiment.

It is further envisioned that a single inflator may be used to inflate the multi-piece cushion structure to expand EEAS 104 disposed within sleeve 172 or outside the air bag system 162, such as shown in FIG. 14. FIG. 16 shows an air bag system 182 with an inflator 120 that is attached to tubing 184, which is in turn attached to cushions 112. Upon deployment, inflation gas passes through the tubing 184 and into each cushion 112 expanding them and propelling plate 168 causing attached EEAS 104 to expand. The cushions 112 may be anchored to the tubing 184, the air bag system structure (not shown), or the vehicle structure (not shown) using conventional fastening approaches used with air bags currently in production. The non-moving side or fixed side of the EEAS 104 may be anchored to the tubing 184, the air bag system structure, (not shown), or the vehicle structure (not shown).

Figure 17:
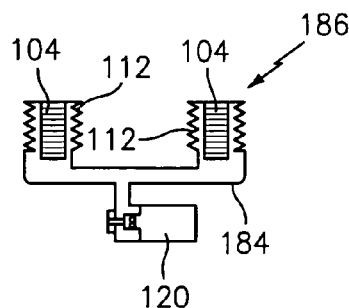
FIG. 17 illustrates an air bag system with a single inflator that is attached to a pair of air bag cushions via tubing, each cushion having a honeycomb celled material disposed therein in accordance with an exemplary embodiment.

FIG. 17 shows an air bag system 186 with an inflator 120 that is attached to tubing 184, which in turn is attached to cushions 112. Upon deployment, inflation gas passes through tubing 184 and into each cushion 112 expanding respective cushions 112 and corresponding attached EEAS 104. Cushions 112 may be anchored to the tubing 184, the air bag system structure (not shown), or the vehicle structure (not shown) using conventional fastening approaches used with air bags currently in production. The non-moving side or fixed side of each EEAS 104 may be anchored to tubing 184, the air bag system structure (not shown), or the vehicle structure (not shown).

The aluminum honeycomb material expands to 60 times its original thickness and can be deployed with 1/10 the energy the material manages when deployed. The use of the metallic honeycomb celled material, such as aluminum, for example, can improve restraint of occupants, as well as improve spaciousness or a balance of both. Note that within the scope of the concepts herein, it may be possible to use other celled material geometries beyond a honeycomb. For instance, a diamond shaped geometry may be used that can be expanded from a compressed state to an expanded state.

It is also to be noted that, within the scope of the embodiments discussed herein, it may be possible to utilize an air bag cushion deployed with the same cushion for both the EEAS 104 located within the cushion and the EEAS 104 located outside the cushion.

The above described exemplary embodiments provide an energy management deployment system that can be easily carried from one vehicle design to another with minimal work and allows easy tuning for specific vehicle parameters and accommodation of a larger range of occupant sizes. Furthermore, the energy management deployment system increases crash performance, while enabling a more spacious interior and more styling flexibility.

While the invention has been described with reference to a preferred embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. An air bag system comprising:
   a vehicle structure;
   an air bag cushion;
   an inflator configured to inflate said air bag cushion; and
   a celled material expandable along an axis of expansion from a dormant state to a deployed state, said celled material operably coupled to said air bag cushion and said vehicle structure such that upon an inflation of said air bag cushion said celled material is stretched along said axis of expansion by said air bag cushion to thereby cause a deployment of said celled material from said dormant state to said deployed state;
   wherein inflation of said air bag cushion deploys said celled material via energy harnessed from expansion of said air bag cushion to provide power to expand said celled material.

2. The system of claim 1, wherein said celled material can be loaded to absorb energy in a direction approximately 90 degrees from said axis of expansion of said celled material.

3. The system of claim 1, wherein a sheath is disposed between said celled material and said air bag cushion to prevent one of said air bag cushion and said celled material from damaging the other of said air bag cushion and said celled material during said deployment.

4. The system of claim 1, wherein said celled material is at least one of:
   internal to said air bag cushion so that direct contact of said celled material and an object or occupant is avoided; and
   external to said air bag cushion.

5. The system of claim 1, wherein said celled material supplements gas pressure for a means to provide energy absorption within the air bag system.

6. The system of claim 1, wherein said air bag cushion is one of a bellows cushion structure and a multiple piece cushion structure.

7. The system of claim 1, wherein said cushion includes at least one tether to control deployment trajectory of said celled material.

8. The system of claim 1, wherein the air bag cushion is one of a knee air bag, side impact air bag, a pelvis thorax air bag, and curtain air bag.

9. The system of claim 1, wherein said celled material further comprises a honeycomb shaped material.

10. The system of claim 1, further comprising:
tubing in fluid communication with said inflator and said air bag cushion, said tubing being configured to direct gas from said inflator into said cushion.

11. An air bag system comprising:
a vehicle structure;
an air bag cushion
an inflator configured to inflate said air bag cushion; and
a honeycomb brick of celled material expandable from a dormant state to a deployed state when said honey comb brick is pulled into a fully deployed and expanded state solely by an inflation of said air bag cushion, said celled material operably coupled to said air bag cushion and to said vehicle structure such that a deployment of said air bag cushion causes deployment of said honeycomb celled material from said dormant state to said deployed state.

12. The system of claim 11, wherein said celled material is disposed outside of said air bag cushion.

13. A system to harness energy from deployment of an air bag to expand an energy absorbing structure comprising:
an air bag module;
an air bag cushion disposed in the air bag module;
an air bag inflator disposed in the air bag module, the air bag inflator in operable communication with the air bag to inflate the same; and
a celled material expandable from a dormant state to a deployed state, said celled material operably coupled to said air bag cushion and said air bag module, said celled material being disposed substantially inside said air bag cushion;
wherein deployment of said air bag cushion causes deployment of said celled material from said dormant state to said deployed state.

14. The system of claim 13, wherein said celled material further comprises a honeycomb shaped material.

15. A method for attenuating a vehicle crash energy impact, comprising:
attaching a volume-filling mechanical structure to at least one of a vehicle structure, an air bag cushion, and an inflator configured to inflate said air bag cushion, wherein the volume-filling mechanical structure comprises a celled material expandable when pulled by said air bag cushion from a dormant state into a deployed state solely by an inflation of said air bag cushion; said celled material operably coupled at respective opposing ends thereof to said air bag cushion and said vehicle structure; and
expanding said celled material by deploying said air bag cushion, thus causing a deployment of said celled material from said dormant state to said deployed state, and wherein the celled material absorbs kinetic energy from the energy impact.

16. The method of claim 15, wherein the step of expanding said celled material is in a transverse plane substantially perpendicular to an anticipated crash axis, wherein the anticipated crash axis is substantially parallel to a cellular axis of cells of the celled material.

17. The method of claim 16, further comprising sensing an impending crash, wherein said expanding said celled material is responsive thereto.

18. The method of claim 15, wherein said celled material is one of disposed internal and external the air bag cushion.

19. The method of claim 15, further comprising:
disposing a sheath between said celled material and said air bag cushion to prevent one of said air bag cushion and said celled material from damaging the other of said air bag cushion and said celled material during said deployment.

20. The method of claim 15, wherein said celled material further comprises a honeycomb shaped material.

* * * * *